US012720530B2

(12) United States Patent
Fu

(10) Patent No.: US 12,720,530 B2
(45) Date of Patent: Aug. 25, 2026

(54) SCHEDULING INTERVAL INDICATION METHOD AND APPARATUS

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 630 days.

(21) Appl. No.: 18/004,249

(22) PCT Filed: Jul. 23, 2020

(86) PCT No.: PCT/CN2020/103807
§ 371 (c)(1),
(2) Date: Jan. 4, 2023

(87) PCT Pub. No.: WO2022/016454
PCT Pub. Date: Jan. 27, 2022

(65) Prior Publication Data

US 2023/0269733 A1 Aug. 24, 2023

(51) Int. Cl.
*H04W 72/1268* (2023.01)
*H04L 5/00* (2006.01)

(52) U.S. Cl.
CPC ....... *H04W 72/1268* (2013.01); *H04L 5/0092* (2013.01)

(58) Field of Classification Search
CPC ......... H04W 72/1268; H04W 72/0446; H04W 72/21; H04L 5/0092; H04L 5/0044
See application file for complete search history.

(56) References Cited

U.S. PATENT DOCUMENTS

2020/0100286 A1 3/2020 Xu et al.
2022/0353898 A1* 11/2022 Li ......................... H04L 1/1887
2023/0079128 A1* 3/2023 Wang .................... H04W 72/23
370/329

FOREIGN PATENT DOCUMENTS

CN 110650001 1/2020

OTHER PUBLICATIONS

3GPP TS 38.214, "3rd Generation Partnership Project; Technical Specification Group Radio Access Network; NR; Physical layer procedures for data (Release 16)", 3GPP TS 38.214 V16.2.0, Jun. 2020 (Year: 2020).*

(Continued)

*Primary Examiner* — Thinh D Tran
(74) *Attorney, Agent, or Firm* — Finnegan, Henderson, Farabow, Garrett & Dunner, L.L.P.

(57) ABSTRACT

The present disclosure relates to a scheduling interval indication method and apparatus, which are applicable to a base station. Said method comprises: determining a parameter value within a first value range, the parameter value being used for indicating the number of slots corresponding to a scheduling interval of a physical uplink shared channel, and an upper limit value of the first value range being greater than 32; and sending the parameter value to a terminal. According to the technical solution of the present disclosure, as the upper limit value of the first value range is greater than 32, the base station can select a value greater than 32 as the parameter value k2, so that the scheduling interval determined by the terminal according to the larger k2 is also larger, being convenient for terminals with weaker processing capabilities to complete the reception of downlink control information and the scheduling of the physical uplink shared channel according to downlink control information.

13 Claims, 5 Drawing Sheets

(56) References Cited

OTHER PUBLICATIONS

International Search Report and Written Opinion of International Application No. PCT/CN2020/103807, mailed Apr. 29, 2021, 14 pages.
Examination report for India Application No. 202347002581, issued on May 26, 2023, 7 pages.
Qualcomm Incorporated, "Control Interval and Scheduling Interval", 3GPP TSG-RAN WG1 #86, R1-166361, Aug. 22-26, 2016, Gothenburg, Sweden, 7 pages.

* cited by examiner

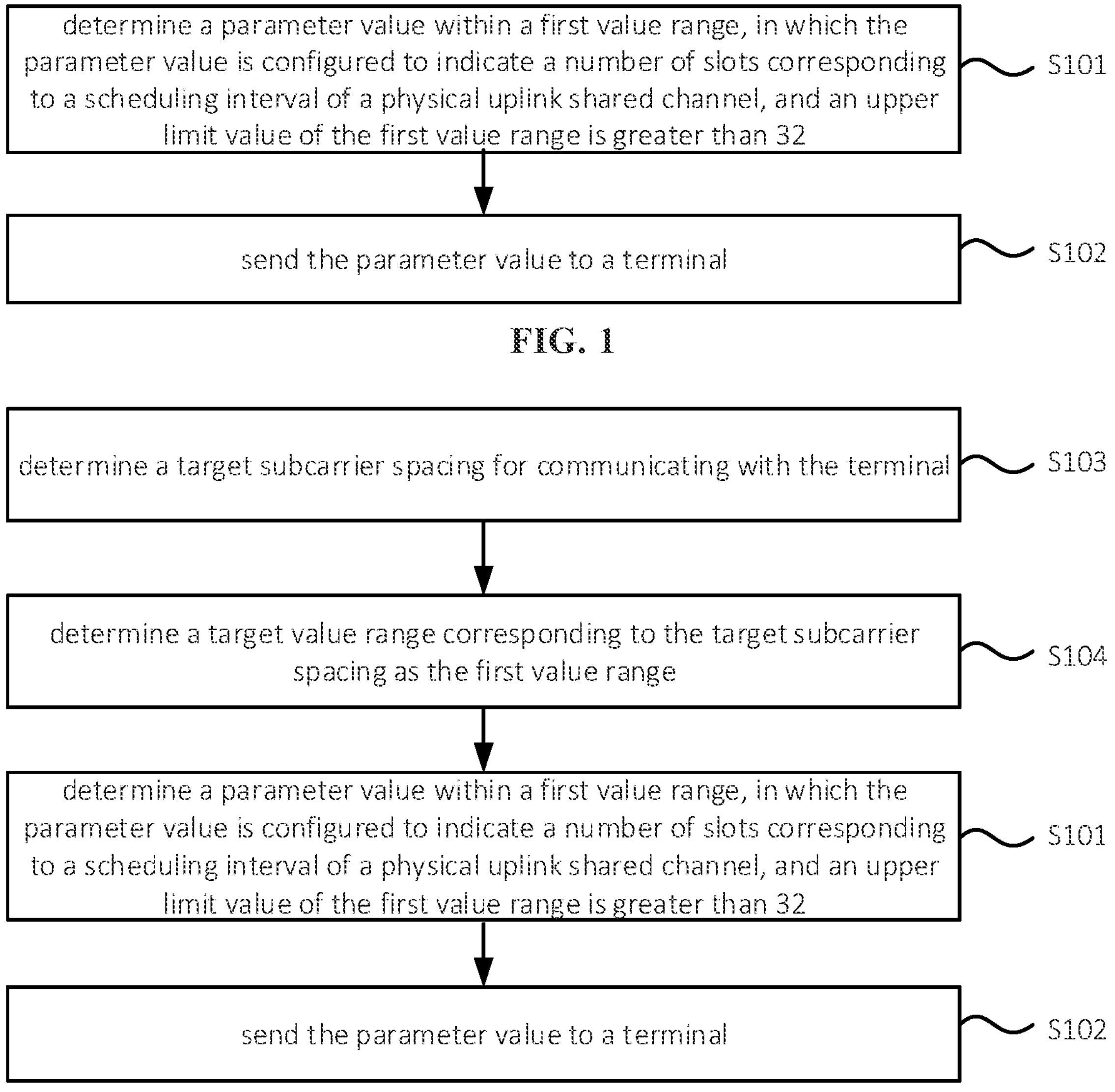
determine a parameter value within a first value range, in which the parameter value is configured to indicate a number of slots corresponding to a scheduling interval of a physical uplink shared channel, and an upper limit value of the first value range is greater than 32
S101
send the parameter value to a terminal
S102
FIG. 1
determine a target subcarrier spacing for communicating with the terminal
S103
determine a target value range corresponding to the target subcarrier spacing as the first value range
S104
determine a parameter value within a first value range, in which the parameter value is configured to indicate a number of slots corresponding to a scheduling interval of a physical uplink shared channel, and an upper limit value of the first value range is greater than 32
S101
send the parameter value to a terminal
S102
FIG. 2

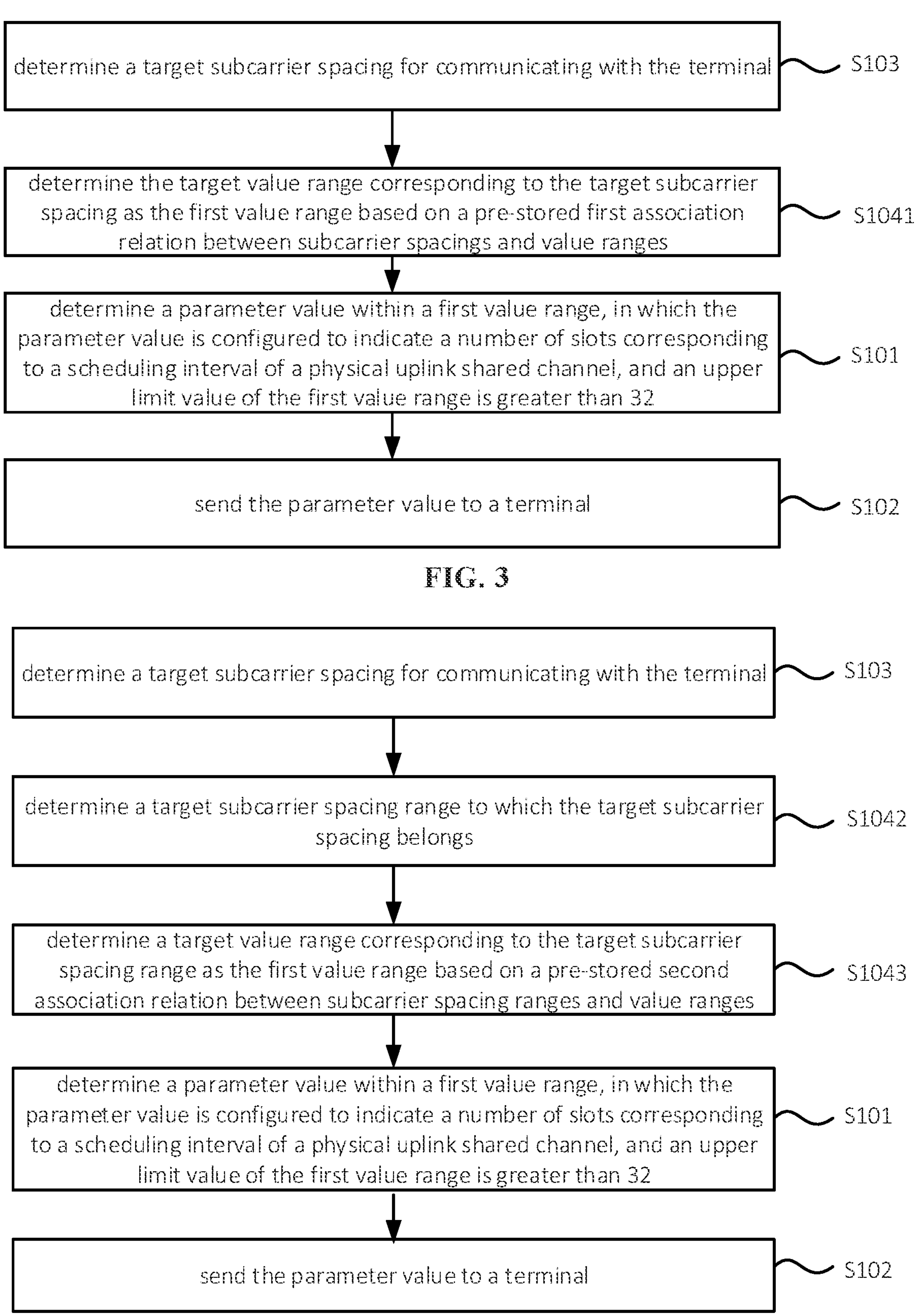
determine a target subcarrier spacing for communicating with the terminal
S103
determine the target value range corresponding to the target subcarrier spacing as the first value range based on a pre-stored first association relation between subcarrier spacings and value ranges
S1041
determine a parameter value within a first value range, in which the parameter value is configured to indicate a number of slots corresponding to a scheduling interval of a physical uplink shared channel, and an upper limit value of the first value range is greater than 32
S101
send the parameter value to a terminal
S102
FIG. 3
determine a target subcarrier spacing for communicating with the terminal
S103
determine a target subcarrier spacing range to which the target subcarrier spacing belongs
S1042
determine a target value range corresponding to the target subcarrier spacing range as the first value range based on a pre-stored second association relation between subcarrier spacing ranges and value ranges
S1043
determine a parameter value within a first value range, in which the parameter value is configured to indicate a number of slots corresponding to a scheduling interval of a physical uplink shared channel, and an upper limit value of the first value range is greater than 32
S101
send the parameter value to a terminal
S102
FIG. 4

SCHEDULING INTERVAL INDICATION METHOD AND APPARATUS

CROSS-REFERENCE TO RELATED APPLICATION

This application is a national phase of International Application No. PCT/CN2020/103807, filed on Jul. 23, 2020, the content of which is hereby incorporated by reference in its entirety.

TECHNICAL FIELD

The disclosure relates to a field of communication technologies, and particularly to a scheduling interval indication method, a scheduling interval indication apparatus, an electronic device and a computer readable storage medium.

BACKGROUND

During the communication process between a terminal and a base station, the base station sends Downlink Control Information (DCI) to the terminal within a downlink slot n, to schedule transmission of uplink data. In detail, the base station sends the DCI to the terminal within the slot n, to schedule transmission of uplink data on a Physical Uplink Shared Channel (PUSCH) within a slot (n+k2).

The k2 is a number of slots corresponding to a scheduling interval between the PUSCH and the corresponding DCI. The value of k2 may be configured by the base station for the terminal via a signaling. In the related art, the value of k2 ranges from 0 to 32, and the base station may select a value from 0 to 32 as the value of k2 and send it to the terminal.

The length of the slot in the time domain is related to the Subcarrier Spacing (SCS). In the related art, the terminal and the base station mainly communicate with each other in a frequency band lower than 52.6 GHz. In this case, the SCS of the communication may be 15 kHz, 30 kHz, 60 kHz, or 120 kHz. For example, if the SCS is 15 kHz, one slot is 1 ms. If the SCS is 30 kHz, one slot is 0.5 ms. If the SCS is 60 kHz, one slot is 0.25 ms. That is, the larger the SCS, the shorter the length of the slot in the time domain is.

SUMMARY

According to a first aspect of the disclosure, a scheduling interval indication method, performed by a base station, is provided. The method includes:

determining a parameter value within a first value range, in which the parameter value is configured to indicate a number of slots corresponding to a scheduling interval of a Physical Uplink Shared Channel (PUSCH), and an upper limit value of the first value range is greater than 32; and sending the parameter value to a terminal.

According to a second aspect of the disclosure, an electronic device is provided. The electronic device includes:

a processor; and a memory for storing instructions executable by the processor; in which the processor is configured to implement the method of any of the above embodiments.

According to a third aspect of the disclosure, a computer readable storage medium storing computer programs is provided. When the computer programs are executed by a processor, the method of any of the above embodiments is implemented.

BRIEF DESCRIPTION OF THE DRAWINGS

A brief description of drawings used in the embodiments is given below. Obviously, the drawings in the following descriptions are only used to illustrate examples of the embodiments of the disclosure, and for those skilled in the art, other embodiments can be obtained.

FIG. 1 is a flowchart of a scheduling interval indication method according to the embodiment of the disclosure.

FIG. 2 is a flowchart of another scheduling interval indication method according to the embodiment of the disclosure.

FIG. 3 is a flowchart of still another scheduling interval indication method according to the embodiment of the disclosure.

FIG. 4 is a flowchart of yet another scheduling interval indication method according to the embodiment of the disclosure.

DETAILED DESCRIPTION

Figure 5:
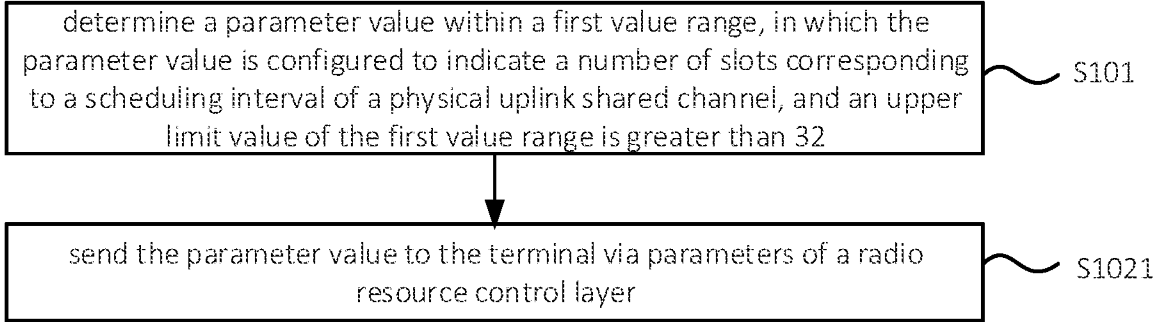
FIG. 5 is a flowchart of yet another scheduling interval indication method according to the embodiment of the disclosure.

Reference will be made clearly and completely in the technical solution of the embodiments of the disclosure with the accompanying drawings. Obviously, the embodiments described here are only part of the embodiments of the disclosure and are not all embodiments of the disclosure. Based on the embodiments of the disclosure, other embodiments obtained by those skilled in the art without inventive works are within the scope of the disclosure.

With the development of communication technologies, the communication frequency band has been expanded. The terminal and the base station need to communicate in a frequency band above 60 GHz. However, in the high-frequency band, the SCS needs to be expanded to cope with phase noises. For example, if the SCS is expanded to 960 kHz, one slot is 0.015625 ms, which is 1/64 ms.

It can be seen that the length of one slot is much less than 1 ms in the high-frequency band communication. For example, if one slot is 1/64 ms, the scheduling interval is only about 0.5 ms even if the base station selects the largest value, i.e., 32 as the value of k2. Since the processing capability of the terminal is limited, it may be difficult to complete receiving the DCI and scheduling the PUSCH according to the DCI within the scheduling interval of 0.5 ms.

According to the embodiments of the disclosure, since the upper limit value of the first value range is greater than 32, the base station may select a value greater than 32 as the parameter value k2, and then the scheduling interval determined by the terminal according to the k2 is also larger, which facilitates the terminal with weaker processing capability to complete the receiving of the DCI and the scheduling of the PUSCH according to the DCI.

FIG. 1 is a flowchart of a scheduling interval indication method according to the embodiment of the disclosure. The method shown in this embodiment may be performed by a base station, which may be, for example, a 5G base station. The base station may communicate with a terminal used as the user equipment (UE). The terminal includes, but is not limited to, a cell phone, a tablet computer, a wearable device, a sensor, an Internet of Things (IoT) device, and other electronic devices.

As illustrated in FIG. 1, the scheduling interval indication method includes the following.

At step S101, a parameter value is determined within a first value range. The parameter value is configured to indicate a number of slots corresponding to a scheduling interval of a Physical Uplink Shared Channel (PUSCH), and an upper limit value of the first value range is greater than 32.

At step S102, the parameter value is sent to a terminal.

In an embodiment, the base station may determine a value within the first value range whose upper limit value is greater than 32 as the parameter value. The parameter value is used to indicate the number of slots corresponding to the scheduling interval of the PUSCH, i.e., k2. The parameter value is sent to the terminal.

Since the upper limit value of the first value range is greater than 32, even if the Subcarrier Spacing (SCS) of the communication between the base station and the terminal is smaller, the base station can select a larger parameter value within the first value range and sends it to the terminal, so that the scheduling interval of the PUSCH may be larger to apply to the terminals with weaker processing capacity (which can be measured by the amount of data that can be processed per unit of time) to complete the receiving of the Downlink Control Information (DCI) and the scheduling of the PUSCH based on DCI.

After receiving the DCI, the terminal needs to analyze the DCI and determine a slot in which the PUSCH sends the uplink data to the base station. The above operations are time consuming, and it takes even longer for the terminals with lower processing capability to perform the above operations. In the case that the scheduling interval is short, after receiving the DCI, it is possible that the terminal needs to send the uplink data to the base station on the PUSCH when the analyzation of the DCI and the determination of the slot in which the terminal sends the uplink data to the base station on the PUSCH have not been completed or when the preparation of the uplink data has not been completed. However, since the terminal does not determine the slot in which the uplink data is sent to the base station on the PUSCH or does not complete the preparation of the uplink data, problems in the communication process may occur.

In this embodiment, the upper limit value of the first value range is greater than 32, for example, the value range is 0 to 63, or 0 to 127, the base station may select a value greater than 32 as the parameter value k2, and then the scheduling interval determined by the terminal according to the larger k2 is also larger. For example, if k2 is 127, the SCS is 960 kHz and a slot is 1/64 ms, it is also possible to ensure that the scheduling interval is 2 ms, which facilitates the terminal with weaker processing capability to complete the reception of the DCI and the scheduling of the PUSCH according to DCI, compared with the scheduling interval of 0.5 ms in the related art.

In some embodiments, the upper limit value is 2n−1, and n is an integer greater than 5.

In an embodiment, the base station may send the parameter value determined within the first value range to the terminal via a Radio Resource Control (RRC) signaling. The parameter value may be included in the PUSCH-TimeDomainResourceAllocation of the RRC signaling.

Since the terminal sends the parameter to the terminal via the signaling, the parameter value occupies some bits in the signaling, and the maximum value indicated by n bits is 2n−1. Therefore, in order to make full use of the bits in the signaling, the above upper limit value can be set to $2^n-1$, and n is an integer greater than 5. For example, if n=6, the first value range is 0 to $2^6-1=63$. If n=7, the first value range is 0 to $2^7-1=127$. If n=8, the first value range is 0 to $2^8-1=255$.

It is noteworthy that the technical solution of the disclosure increases the upper limit value of the value range to choose the parameter value k2, such that the base station chooses a larger parameter value k2, but the parameter value chosen by the base station is within this value range. The parameter value can be selected according to the needs, and the parameter value does not need to be the upper limit value. For example, if the upper limit value of 127, the parameter value k2 chosen by the base station may be 5, 121 or other values. The specific way of choosing the parameter value within the first value range by the base station can be determined according to the actual situation, which is not limited in the embodiment.

FIG. 2 is a flowchart of another scheduling interval indication method according to the embodiment of the disclosure. As illustrated in FIG. 2, before determining the parameter value within the first value range, the method further includes the following.

At step S103, a target Subcarrier Spacing (SCS) for communicating with the terminal is determined.

At step S104, a target value range corresponding to the target SCS is determined as the first value range.

In an embodiment, since the larger the SCS, the shorter a duration corresponding to one slot in the time domain is, for different SCSs, even if the determined parameter values k2 are the same, the scheduling intervals may be different. In order to ensure that the value range is compatible with the SCS, the association relation between the SCSs and the value ranges can be preset and stored. For example, if the base station and the terminal communicate with each other based on the target SCS, and the target SCS corresponds to the target value range, the target value range can be determined as the first value range.

In some embodiments, an upper limit value of the target value range corresponding to the target SCS greater than or equal to 240 KHz is greater than 32.

In an embodiment, if the SCS is less than 240 KHz, such as, 15 KHz, 30 KHz, 60 KHz and 120 KHz, the duration corresponding to one slot in the time domain is not very short, so the value range in the related art can be used for the base station to obtain the parameter value k2. For example, the parameter value k2 is selected between 0 and 32.

If the SCS is greater than or equal to 240 KHz, such as 240 KHz, 248 KHz and 960 KHz, the duration corresponding to one slot in the time domain is relatively short, and the target value range with an upper limit value greater than 32, such as a value range of 0 to 63, 0 to 127, or 0 to 255, can be selected for the base station to choose the parameter value, so that the base station can choose a larger parameter value.

FIG. 3 is a flowchart of still another scheduling interval indication method according to the embodiment of the disclosure. As illustrated in FIG. 3, determining the target value range corresponding to the target SCS as the first value range includes the following.

At step S1041, the target value range corresponding to the target SCS is determined as the first value range based on a pre-stored first association relation between SCSs and value ranges.

In an embodiment, each SCS corresponds to a respective value range. That is, the pre-stored association relation between the SCSs and the value ranges may be the association relation between each SCS and its corresponding value range, which is called the first association relation. The base station can determine the target value range corresponding to the target SCS according to the first association relation.

The first association relation may include a plurality of SCSs and a plurality of value ranges. For example, if the SCS is 15 KHz, the target value range determined from the plurality of value ranges according to the first association relation is 0 to 15. If the SCS is 120 KHz, the target value range determined from the plurality of value ranges according to the first association relation is 0 to 32. If the SCS is 240 KHz, the target value range determined from the plurality of value ranges according to the first association relation is 0 to 63. If the SCS is 480 KHz, the target value range determined from the plurality of value ranges according to the first association relation is 0 to 127. If the SCS is 960 KHz, the target value range determined from the plurality of value ranges according to the first association relation is 0 to 255.

FIG. 4 is a flowchart of yet another scheduling interval indication method according to the embodiment of the disclosure. As illustrated in FIG. 4, determining the target value range corresponding to the target SCS as the first value range includes the following.

At step S1042, a target SCS range to which the target SCS belongs is determined.

At step S1043, a target value range corresponding to the target SCS range is determined as the first value range based on a pre-stored second association relation between SCS ranges and value ranges.

In an embodiment, each SCS range corresponds to a respective value range. That is, the pre-stored association relation between the SCSs and the value ranges can be the association relation between the SCS ranges to which the SCSs belong and the value ranges, which is called the second association relation. The base station may first determine the target SCS range to which the target SCS belongs, and then determine the target value range corresponding to the target SCS range according to the second association relation.

The second association relation may include a plurality of SCS ranges and a plurality of value ranges. For example, if the SCS range is 15 KHz to 120 KHz, the target value range determined from the plurality of value ranges according to the second association relation is 0 to 32, and when the target SCS belongs to the SCS range of 15 KHz to 120 KHz, the base station determines the parameter value between 0 and 32. If the SCS range is 240 KHz to 960 KHz, the target value range determined from the plurality of value ranges according to the second association relation is 0 to 127, and the base station determines the parameter value between 0 and 127 when the target SCS belongs to the SCS range of 240 KHz to 960 KHz.

FIG. 5 is a flowchart of yet another scheduling interval indication method according to the embodiment of the disclosure. As illustrated in FIG. 5, sending the parameter value to the terminal includes the following.

At step S1021, the parameter value is sent to the terminal via parameters of a RRC layer.

In an embodiment, the base station may send the parameter value determined within the first value range to the terminal via the RRC signaling, in which the parameter value may be included in the PUSCH-TimeDomainResourceAllocation of the RRC signaling. The PUSCH-TimeDomainResourceAllocation may include not only the parameter value k2, but also other contents such as mappingType.

Certainly, the base station may also send the parameter value to the terminal by other means, for example, by another signaling other than the RRC signaling, or by carrying the parameter value k2 in RRC parameters other than the PUSCH-TimeDomainResourceAllocation, which can be set as desired.

The disclosure further provides another scheduling interval indication method including the following.

The base station may pre-store a table for ensuring the association relation between the SCSs and the parameter values k2, determine a corresponding parameter value k2 from the table based on the SCS used in communicating with the terminal, and send the determined parameter value k2 to the terminal. In the table, the parameter value k2 may increase as the SCS increases.

The disclosure also provides a scheduling interval determining method, performed by a terminal. The scheduling interval determining method includes:

determining a scheduling interval based on the parameter value sent according to the scheduling interval indication method of any of the above embodiments.

The terminal may determine, based on the scheduling interval, the number of slots after receiving the DCI, after which the uplink information is sent on the PUSCH.

Figure 6:
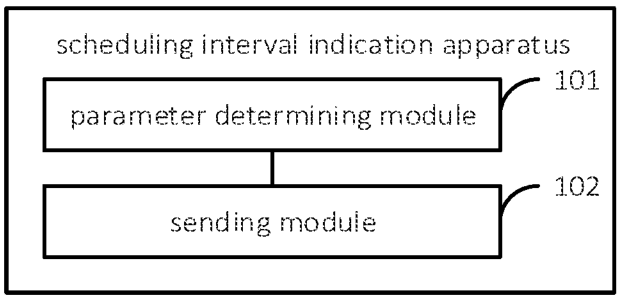
FIG. 6 is a schematic diagram of a scheduling interval indication apparatus according to the embodiment of the disclosure.

Corresponding to the above embodiment of the scheduling interval indication method, the disclosure also provides the embodiments of the scheduling interval indication apparatus FIG. 6 is a schematic diagram of a scheduling interval indication apparatus according to the embodiment of the disclosure. The apparatus illustrated in this embodiment may be a base station, which may be, for example, a 5G base station. The base station may communicate with the terminal which can be used as the user equipment. The terminal includes, but is not limited to, a cell phone, a tablet computer, a wearable device, a sensor, an IoT device, and other electronic devices.

As illustrated in FIG. 6, the scheduling interval indication apparatus includes: a parameter determining module 101 and a sending module 102.

The parameter determining module 101 is configured to determine a parameter value within a first value range, in which the parameter value is configured to indicate a number of slots corresponding to a scheduling interval of a PUSCH, and an upper limit value of the first value range is greater than 32.

The sending module 102 is configured to send the parameter value to a terminal.

In some embodiments, the upper limit value is $2^n-1$, and n is an integer greater than 5.

In some embodiments, the upper limit value is selected from a group including at least one of:

63, 127 or 255.

Figure 7:
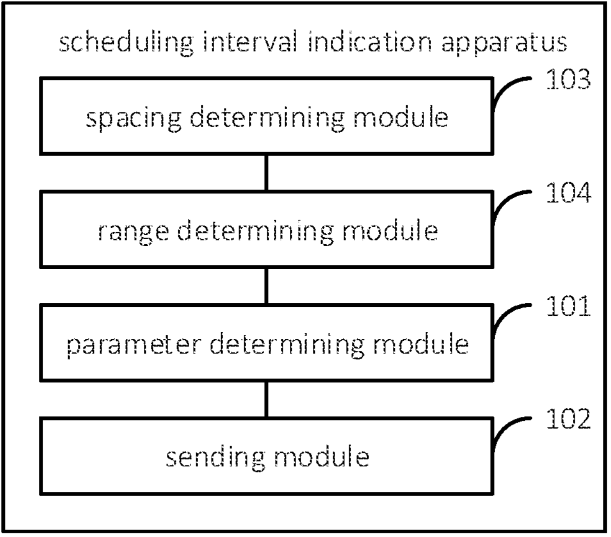
FIG. 7 is a schematic diagram of another scheduling interval indication apparatus according to the embodiment of the disclosure.

FIG. 7 is a schematic diagram of another scheduling interval indication apparatus according to the embodiment of the disclosure. As illustrated in FIG. 7, the scheduling interval indication apparatus includes: a spacing determining module 103 and a range determining module 104.

The spacing determining module 103 is configured to determine a target SCS for communicating with the terminal.

The range determining module 104 is configured to determine a target value range corresponding to the target SCS as the first value range.

In some embodiments, an upper limit value of the target value range corresponding to the target SCS greater than or equal to 240 KHz is greater than 32.

In some embodiments, the range determining module is configured to: determine the target value range corresponding to the target SCS as the first value range based on a pre-stored first association relation between SCSs and value ranges.

In some embodiments, the range determining module is configured to: determine a target SCS range to which the target SCS belongs, and determine a target value range corresponding to the target SCS range as the first value range based on a pre-stored second association relation between SCS ranges and value ranges.

In some embodiments, the sending module is configured to: send the parameter value to the terminal via parameters of a RRC layer.

With respect to the apparatus in the above embodiments, the specific manner in which each module performs its operation has been described in detail in the embodiments of the relevant method, and will not be described in detail here.

The apparatus embodiments basically correspond to the method embodiments, the related contents can refer to part of the descriptions of the method embodiments. The above-described apparatus embodiments are merely schematic, the modules described above as separate components may or may not be physically separated, and the components displayed as modules may or may not be physical modules, i.e., the components may be located in one area or may be distributed to multiple network modules. Some or all of these modules can be selected according to practical needs to achieve the purpose of the solution of the disclosure. Those skilled in the art can understand and implement the solution without inventive works.

Figure 8:
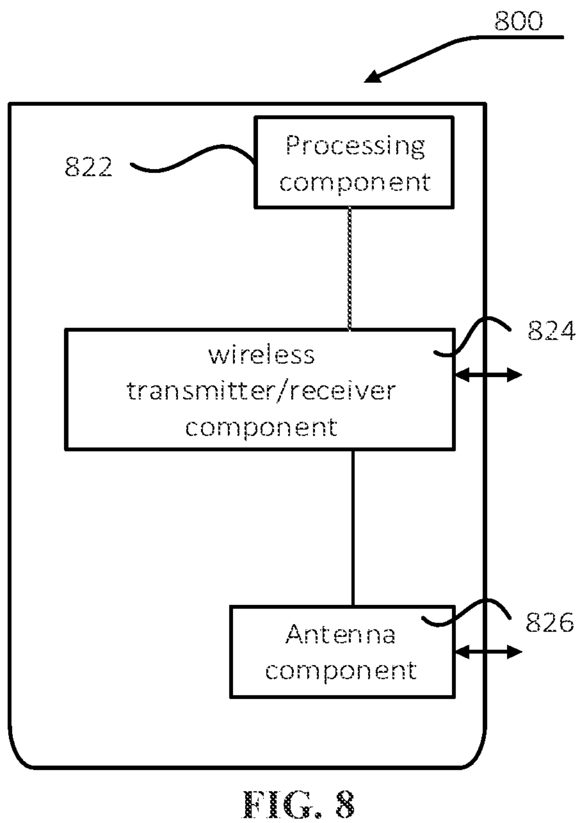
FIG. 8 is a schematic diagram of a scheduling interval indication apparatus according to the embodiment of the disclosure.

FIG. 8 is a schematic diagram of a scheduling interval indication apparatus 800 according to the embodiment of the disclosure. As shown in FIG. 8, the apparatus 800 may be provided as a base station. As shown in FIG. 8, the apparatus 800 includes: a processing component 822, a wireless transmitter/receiver component 824, an antenna component 826, and a signal processing portion specific to the wireless interface. The processing component 822 may further include one or more processors. One of the processors in the processing component 822 may be configured to implement the scheduling interval indication method described in any of the above embodiments.

Figure 9:
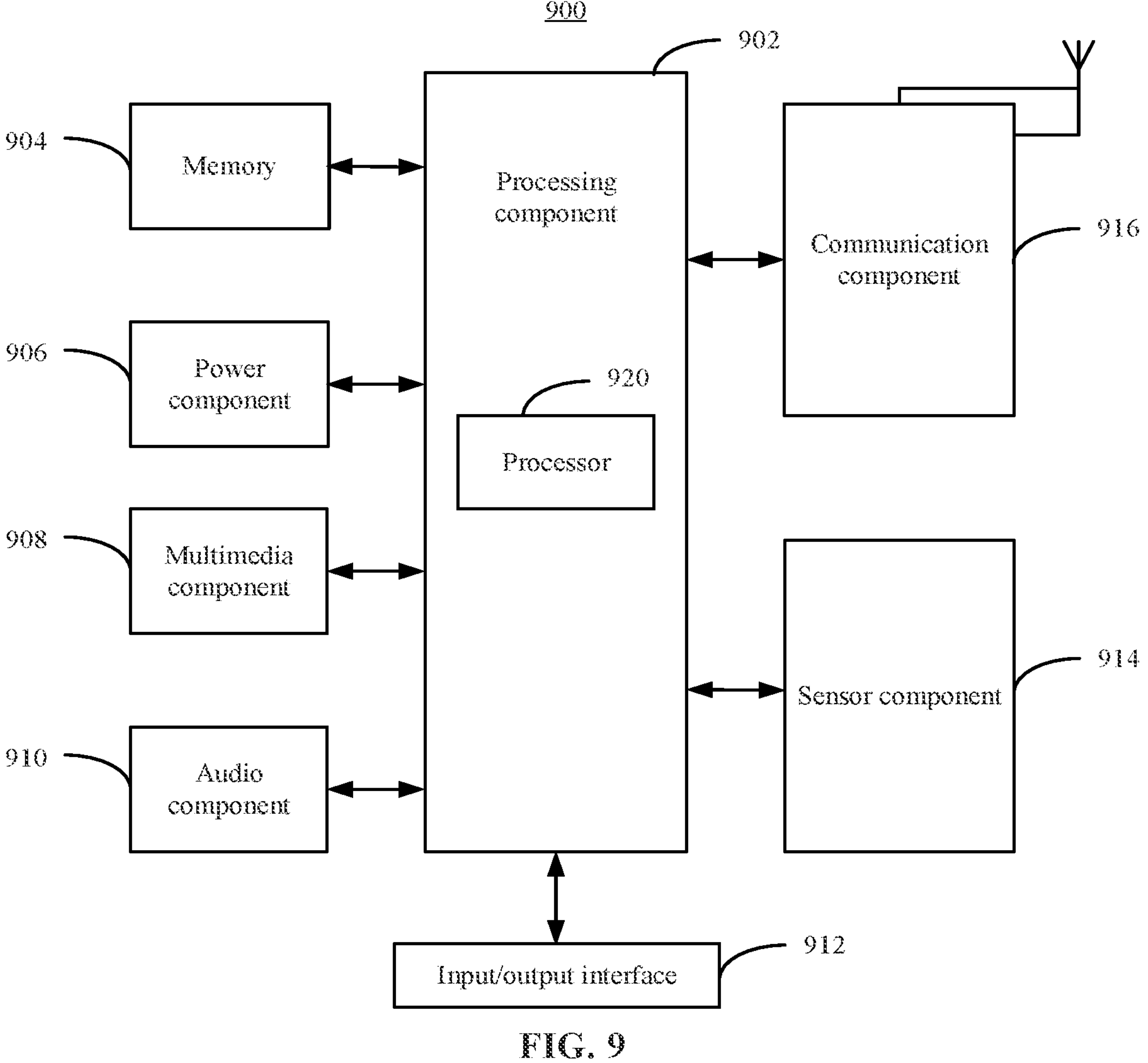
FIG. 9 is a block diagram of a device used for determining a scheduling interval according to an embodiment.

FIG. 9 is a block diagram of a device 900 used for determining a scheduling interval according to an embodiment. For example, the device 900 may be a mobile phone, a computer, a digital broadcasting terminal, a message transceiver device, a game console, a tablet device, a medical device, a fitness device and a personal digital assistant.

As shown in FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to perform all or part of the steps in the above described method. Moreover, the processing component 902 may include one or more modules which facilitate the interaction between the processing component 902 and other components. For example, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front-facing camera and/or a rear-facing camera. When the device 900 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 910 is configured to output and/or input audio signals. For example, the audio component 910 includes a microphone (MIC) configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a Complementary Metal Oxide Semiconductor (CMOS) or Charge-Coupled Device (CCD) image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as WiFi, 2G, 3G, 4G LTE, 5G NR or a combination thereof. In an embodiment, the communication component 916 receives a broadcast signal or broadcast associated information from an external broadcast management system via a broadcast channel. In an embodiment, the communication component 916 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiment, the device 900 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the embodiments, there is also provided a non-transitory computer readable storage medium including executable instructions, such as the memory 904, executable by the processor 920 in the device 900, for performing the above method. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as illustrations only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise". "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The method and apparatus of the embodiments of the disclosure have been described in detail above, and specific examples are applied in the disclosure to illustrate the principles and implementation of the disclosure. The above embodiments are only used to facilitate understanding the method and core ideas of the disclosure. Meanwhile, for those skilled in the art, according to the ideas of this disclosure, there will be changes in the specific implementation and scope of application. In conclusion, the contents of the disclosure should not be understood as limiting the disclosure.

What is claimed is:

1. A scheduling interval indication method, performed by a base station, comprising:

determining a target subcarrier spacing for communicating with a terminal;

determining a target value range corresponding to the target subcarrier spacing as a first value range based on a pre-stored first association relation between subcarrier spacings and value ranges, wherein the first association relation comprises association relations between a plurality of subcarrier spacings (SCSs) and a plurality of value ranges, an upper limit value of the target value range corresponding to the target subcarrier spacing greater than or equal to 240 KHz is greater than 32, target value ranges corresponding to different target subcarrier spacings greater than or equal to 240 KHz have the same upper limit value, and an upper limit value of the target value range corresponding to the target subcarrier spacing less than 240 KHz is equal to 32;

determining a parameter value within the first value range, wherein the parameter value is configured to indicate a number of slots corresponding to a scheduling interval of a physical uplink shared channel, and an upper limit value of the first value range is greater than 32; and sending the parameter value to the terminal.

2. The method of claim 1, wherein the upper limit value is $2n-1$, and n is an integer greater than 5.

3. The method of claim 2, wherein the upper limit value is selected from a group comprising at least one of:

63, 127 or 255.

4. The method of claim 1, wherein determining the target value range corresponding to the target subcarrier spacing as the first value range, comprises:

determining a target subcarrier spacing range to which the target subcarrier spacing belongs; and determining a target value range corresponding to the target subcarrier spacing range as the first value range based on a pre-stored second association relation between subcarrier spacing ranges and value ranges.

5. The method of claim 1, wherein sending the parameter value to the terminal comprises:

sending the parameter value to the terminal via parameters of a radio resource control layer.

6. An electronic device, comprising:

a processor; and a memory for storing instructions executable by the processor;

wherein the processor is configured to:

determine a target subcarrier spacing for communicating with a terminal;

determine a target value range corresponding to the target subcarrier spacing as a first value range based on a pre-stored first association relation between subcarrier spacings and value ranges, wherein the first association relation comprises association relations between a plurality of subcarrier spacings (SCSs) and a plurality of value ranges, an upper limit value of the target value range corresponding to the target subcarrier spacing greater than or equal to 240 KHz is greater than 32, target value ranges corresponding to different target subcarrier spacings greater than or equal to 240 KHz have the same upper limit value, and an upper limit value of the target value range corresponding to the target subcarrier spacing less than 240 KHz is equal to 32;

determine a parameter value within the first value range, wherein the parameter value is configured to indicate a number of slots corresponding to a scheduling interval of a physical uplink shared channel, and an upper limit value of the first value range is greater than 32; and send the parameter value to the terminal.

7. The electronic device of claim 6, wherein the upper limit value is 2n 1, and n is an integer greater than 5.

8. The electronic device of claim 7, wherein the upper limit value is selected from a group comprising at least one of:

63, 127 or 255.

9. The electronic device of claim 6, wherein the processor is further configured to:

determine a target subcarrier spacing range to which the target subcarrier spacing belongs; and determine a target value range corresponding to the target subcarrier spacing range as the first value range based on a pre-stored second association relation between subcarrier spacing ranges and value ranges.

10. The electronic device of claim 6, wherein the processor is further configured to:

send the parameter value to the terminal via parameters of a radio resource control layer.

11. A non-transitory computer readable storage medium having stored thereon computer programs that, when executed by a processor, cause the processor to perform a scheduling interval indication method, the method comprising:

determine a target subcarrier spacing for communicating with a terminal;

determine a target value range corresponding to the target subcarrier spacing as a first value range based on a pre-stored first association relation between subcarrier spacings and value ranges, wherein the first association relation comprises association relations between a plurality of subcarrier spacings (SCSs) and a plurality of value ranges, an upper limit value of the target value range corresponding to the target subcarrier spacing greater than or equal to 240 KHz is greater than 32 target value ranges corresponding to different target subcarrier spacings greater than or equal to 240 KHz have the same upper limit value, and an upper limit value of the target value range corresponding to the target subcarrier spacing less than 240 KHz is equal to 32;

determining a parameter value within the first value range, wherein the parameter value is configured to indicate a number of slots corresponding to a scheduling interval of a physical uplink shared channel, and an upper limit value of the first value range is greater than 32; and sending the parameter value to the terminal.

12. The non-transitory computer readable storage medium of claim 11, wherein the upper limit value is $2n-1$, and n is an integer greater than 5.

13. The non-transitory computer readable storage medium of claim 12, wherein the upper limit value is selected from a group comprising at least one of:

63, 127 or 255.

* * * * *